United States Patent
Hyatt et al.

(10) Patent No.: US 8,234,958 B2
(45) Date of Patent: Aug. 7, 2012

(54) TOOLHOLDER

(75) Inventors: Gregory A. Hyatt, Barrington, IL (US); Ted R. Massa, Latrobe, PA (US); Linn R. Andras, Ligonier, PA (US); James J. Stohr, Greendale, IN (US)

(73) Assignee: Kennametal Inc., Latrobe, PA (US)

( * ) Notice: Subject to any disclaimer, the term of this patent is extended or adjusted under 35 U.S.C. 154(b) by 311 days.

(21) Appl. No.: 12/169,368

(22) Filed: Jul. 8, 2008

(65) Prior Publication Data
US 2008/0271581 A1    Nov. 6, 2008

Related U.S. Application Data

(62) Division of application No. 10/526,413, filed as application No. PCT/US03/27610 on Sep. 2, 2003, now Pat. No. 7,416,372.

(51) Int. Cl.
*B23B 1/00* (2006.01)
*B23B 7/00* (2006.01)
(52) U.S. Cl. ......................................................... 82/118
(58) Field of Classification Search .................. 82/118, 82/1.11, 110, 111, 120, 121, 123, 158, 159; 409/132, 297; 29/899
See application file for complete search history.

(56) References Cited

U.S. PATENT DOCUMENTS

| | | |
|---|---|---|
| 3,460,435 A | 8/1969 | Dahl et al. |
| 3,815,454 A | 6/1974 | Knott |
| 4,132,493 A | 1/1979 | Hosoi |
| 4,486,131 A | 12/1984 | Eckle |
| 4,559,987 A | 12/1985 | Fondronnier et al. |
| 4,946,319 A | 8/1990 | Lyon et al. |
| 5,090,851 A | 2/1992 | White |
| 5,272,945 A | 12/1993 | Lockard |
| 5,352,069 A | 10/1994 | Rourke |
| 5,431,514 A * | 7/1995 | Saito et al. .................... 409/132 |
| 5,562,370 A | 10/1996 | Vogel et al. |
| 5,713,253 A * | 2/1998 | Date et al. ...................... 82/1.11 |
| 6,491,483 B1 | 12/2002 | Ford |
| 6,601,484 B1 * | 8/2003 | Katoh et al. ................... 82/1.11 |
| 6,705,184 B2 * | 3/2004 | Cardemon et al. ............. 82/1.11 |
| 6,775,586 B2 * | 8/2004 | Shibata et al. ................ 700/189 |
| 6,796,755 B2 | 9/2004 | Angeloni |

(Continued)

FOREIGN PATENT DOCUMENTS
DE    3209879 A    9/1983
(Continued)

*Primary Examiner* — Will Fridie, Jr.
(74) *Attorney, Agent, or Firm* — Larry R. Meenan, Esq.

(57) ABSTRACT

A toolholder with a controllable critical angle, such as a lead, trailing, rake or clearance angles, includes a tool spindle for retaining the toolholder in a tool rest of a machine tool. The machine tool includes at least one linear axis, for example, three mutually perpendicular axes, a rotary axis and a rotation axis. The rotary axis and/or rotation axis is controllable to move to a specified position in synchronization with a movement of one of the linear axes. An adaptor supports a cutting tool that is retained in the adaptor by a clamp. The cutting tool defines a critical angle, such as a lead angle, a trailing angle, a rake angle and a flank clearance angle, wherein the critical angle is corrected as a vector of movement of at least one of the linear axis is changed. In addition, the cutting tool can be positioned on opposite side of a centerline of rotation of the workpiece to effectively double the life of the cutting tool. A method of controlling a toolholder is also disclosed.

13 Claims, 7 Drawing Sheets

U.S. PATENT DOCUMENTS

| | | |
|---|---|---|
| 6,988,860 B2 | 1/2006 | Ishili et al. |
| 6,997,651 B2 * | 2/2006 | Kawai et al. .................... 407/53 |
| 7,185,412 B2 | 3/2007 | Penick et al. |
| 2003/0143047 A1 | 7/2003 | Ishii et al. |

FOREIGN PATENT DOCUMENTS

| | | |
|---|---|---|
| JP | 2001009603 A | 1/2001 |

* cited by examiner

TOOLHOLDER

This application is a divisional of application Ser. No. 10/526,413, filed Oct. 5, 2005, which is the National Stage of International Application no. PCT/US03/27610, filed Sep. 2, 2003 which claims the benefit of U.S. Provisional Application No. 60/407,864, filed Sep. 3, 2002, the entire of which are herein incorporated by reference.

BACKGROUND OF THE INVENTION

1. Field of the Invention

This invention relates to a toolholder with selectable critical angles, such as a lead angle, a trailing angle, a rake angle, and a flank clearance angle. More particularly, this invention relates to machine tool for turning and threading operations, such as a lathe or a machining center, that allows a specified relationship between the insert geometry and the workpiece to be selectively determined by a software program of a numerically controlled machine tool to maintain a critical angle between the insert and the workpiece as the geometry of the workpiece changes.

2. Description of the Related Art

In most advanced machine tools, movement and control of the machine and its components are actuated by computer numerical controls (CNC). These machine tools are usually equipped with one or more turrets. Each turret can be equipped with a variety of tools and performs several operations on different surfaces of the workpiece.

Typically, a turning operation is performed in two linear axes, such as the X- and Z-axes. A third linear axis, such as the Y-axis, can be added to a turning machine tool to support milling operations in that axis, but not turning operations. As a result, a dedicated toolholder has been required for each desired unique lead angle, thereby increasing the costs associated with the machining operation.

In addition, the rake face of the cutting insert in conventional threading tools is in the X- and Z-axes. As pitch angles increase, the angle between the rake face and the thread becomes significant. Likewise, the clearance angles must be changed, in particular on the leading edge where the angle of the thread may exceed the typical clearance angles, resulting in interference. Therefore, cutting inserts are frequently ground specifically for threads of a specific pitch angle. Manufacturers of such products with various pitch angles must therefore purchase and inventory cutting inserts specifically for each pitch angle.

SUMMARY OF THE INVENTION

Briefly, according to this invention, there is provided a machine tool comprising at least three axes of linear motion, and at least a rotation axis, the at least one rotation axis being controllable to move to a specified position in sequential or simultaneous synchronization with a movement of one of the at least three axes of linear motion, and a toolholder mounted to a tool rest, the toolholder including a cutting tool defining a critical angle with respect to a workpiece, wherein the critical angle is corrected as a vector of movement of at least one of the linear axes is changed.

In another aspect of the invention, a machine tool comprising at least three axes of linear motion, and one of a rotary axis and a rotation axis, the one of the rotary axis and rotation axis being controllable to move to a specified position in synchronization with a movement of one of the at least three axes of linear motion, and a toolholder mounted to a tool rest, the toolholder including a cutting tool defining a lead angle with respect to a workpiece, wherein the lead angle is selectively determined by controlling the rotary axis to move to a specified portion of the workpiece at a specified velocity in synchronization with a movement of one of the at least three axes of linear motion.

In yet another aspect of the invention, a controllable toolholder, the toolholder being mounted in a tool rest of a machine tool comprising at least three axes of linear motion, and at least a rotation axis, the at least one rotation axis being controllable to move to a specified position in synchronization with a movement of one of the at least three axes of linear motion. The toolholder comprises a tool spindle for retaining the toolholder in a tool rest, an adaptor for supporting a cutting tool retained in the adaptor by a clamp, the cutting tool defining a critical angle, wherein the critical angle is corrected as a vector of movement of at least one of the linear axis is changed.

In still yet another aspect of the invention, a method of controlling a machine tool, the machine tool comprising at least three axes of linear motion, one of a rotary axis and a rotation axis, and a toolholder mounted to a tool rest, the toolholder including a cutting tool defining a critical angle with respect to a workpiece, the method comprises the steps of:

moving one of the rotary axis and rotation axis to a specified position in synchronization with a movement of one of the at least three axes of linear motion, correcting the critical angle as a vector of movement of at least one of the linear axis is changed.

In yet another aspect of the invention, a method of controlling a toolholder with a cutting tool, comprises the steps of:

reversing a direction of rotation of a workpiece, and positioning the cutting tool on opposite side of a centerline of rotation of the workpiece.

In still yet another aspect of the invention, a method of controlling a machine tool comprising at least three axes of linear motion, one of a rotary axis and a rotation axis, and a toolholder mounted to a tool rest, the toolholder including a cutting tool, the method comprising the steps of providing a macro including a geometry of a workpiece to be machined and a geometric relationship of the cutting tool with respect to the workpiece, whereby the macro calculates the required movements of the at least three axes of linear motion, and one of the rotary axis and rotation axis required to maintain a specified cutting tool geometry as the cutting tool proceeds across a surface of the workpiece.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
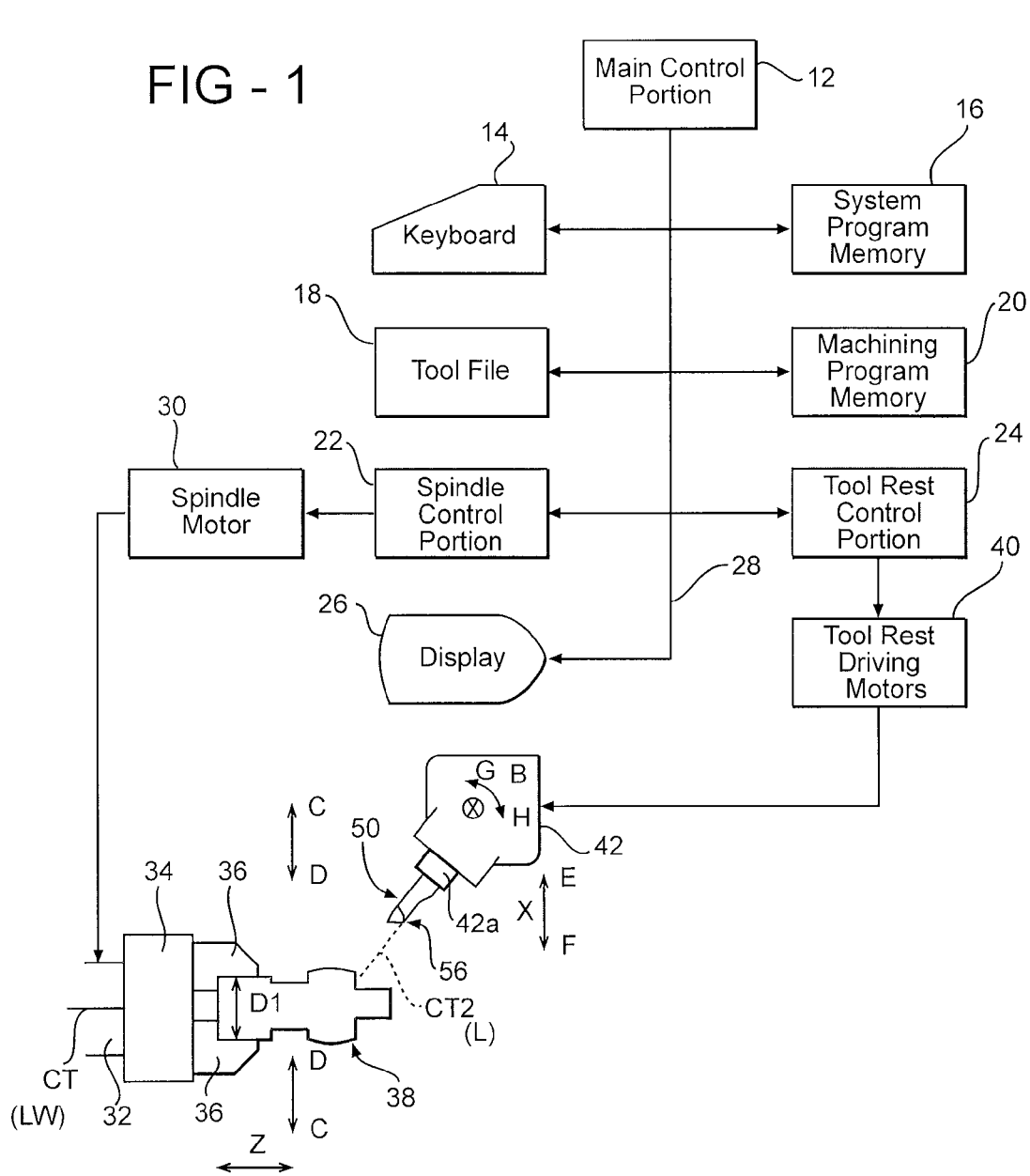
FIG. 1 shows a control block diagram of a machine tool with a toolholder of the invention.

Referring to the drawings, wherein like reference characters represent like elements, FIG. 1 illustrates a machine tool 10 that is actuated by computer numerical controls (CNC). The machine tool 10 has a main control portion 12, an input portion 14, such as a keyboard, a system program memory 16, a tool file 18, a machining program memory 20, a spindle control portion 22, a tool rest control portion 24, and a display 26 that are connected through a bus line 28. A spindle motor 30 is connected with the spindle control portion 22. The spindle motor 30 rotates a spindle 32 with an axial center CT that is parallel to a direction of the Z-axis. The machine tool 10 also includes a chuck 34 with chuck jaws 36 for holding and releasing a workpiece 38 having an outer diameter, D1. The spindle control portion 22 is capable of moving the workpiece 38 in the X-axis direction, as indicated by arrows C and D. When the workpiece 38 is installed in the chuck jaws 36, a longitudinal axis, LW, of the workpiece 38 corresponds to the rotation axis axial center CT of the spindle 32.

The machine tool 10 includes one or more tool rest driving motors 40 that are connected to the tool rest control portion 24. A tool rest 42 is connected to the tool rest driving motor 40 and is capable of movement in the Z-axis direction and in the X-axis direction, as indicated by the arrows E and F. In addition, the tool rest 42 is capable of movement in a Y-axis direction (into and out of the paper), and in a B-axis direction, as indicated by the arrows G and H, by the tool rest driving motor 40. An example of a machine tool actuated by CNC is described in EP 1 186 367 A1, the entire contents of which is incorporated herein by reference.

A tool spindle 42a is formed on the tool rest 42. A toolholder, shown generally at 50 according to the present invention, can be attached, detached and exchanged with the tool spindle 42a. The tool spindle 42a can be of a quick change type as described in U.S. Pat. No. 6,415,696, the entire contents of which is incorporated herein by reference. The tool spindle 42a is free to fix and hold the toolholder 50 and other tools in a predetermined holding state, and is free to rotate, drive and position around a rotation axis (axial center) CT2. Thus, the machine tool 10 includes a rotary axis (B-axis), a rotation axis, CT2, and three axes of linear motion (X-axis, Y-axis and Z-axis). When the toolholder 50 is installed in the tool rest 42, a longitudinal axis, L, or centerline of the toolholder 50 corresponds to the rotation axis CT2 of the tool rest 42.

Figure 2:
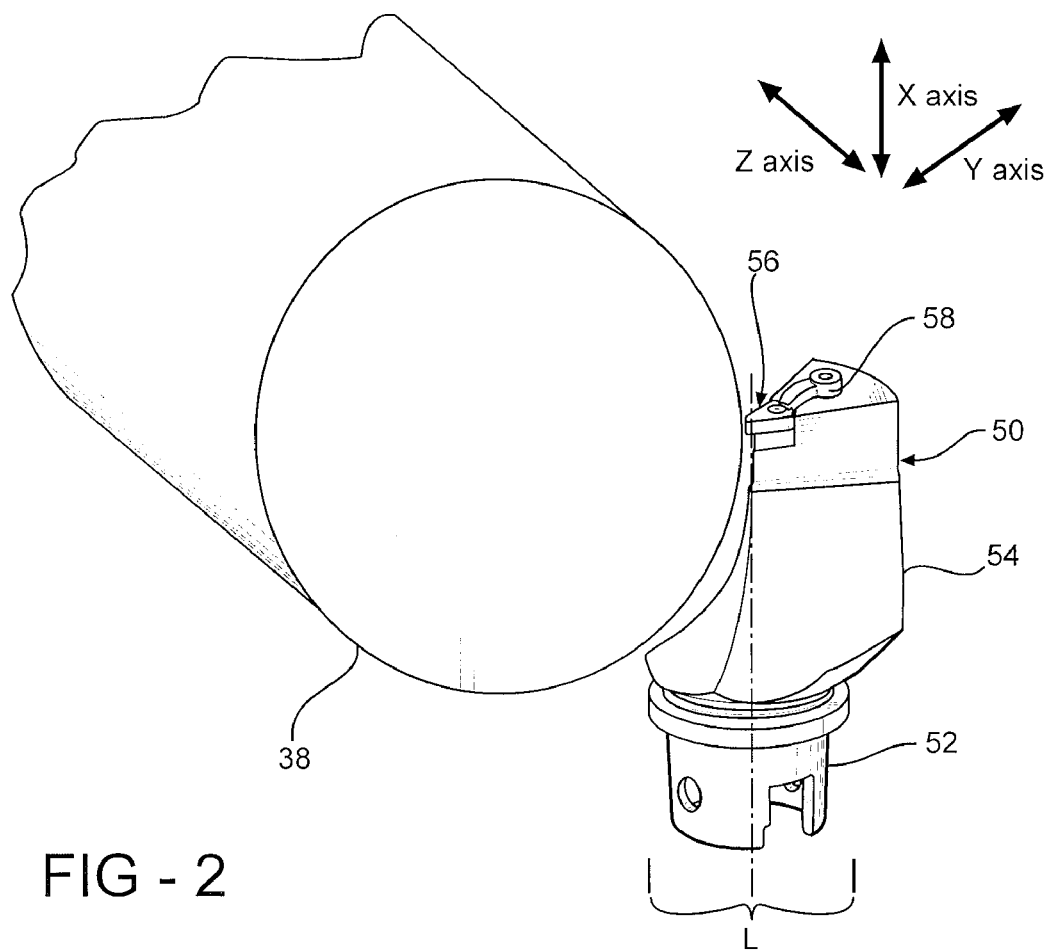
FIG. 2 shows a perspective view of the toolholder according to the invention.
Figure 3:
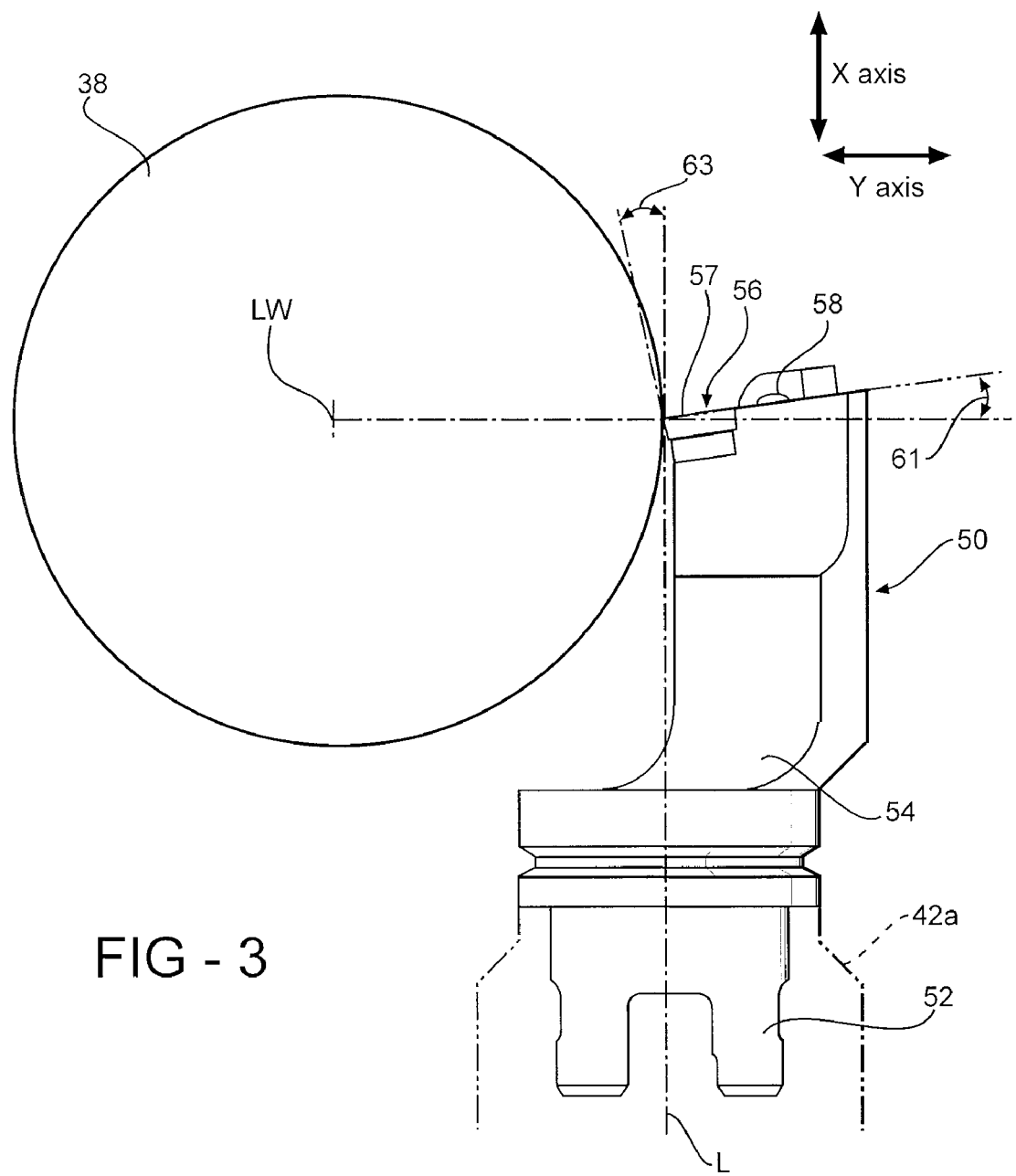
FIG. 3 shows a side view of the toolholder of FIG. 2.
Figure 4:
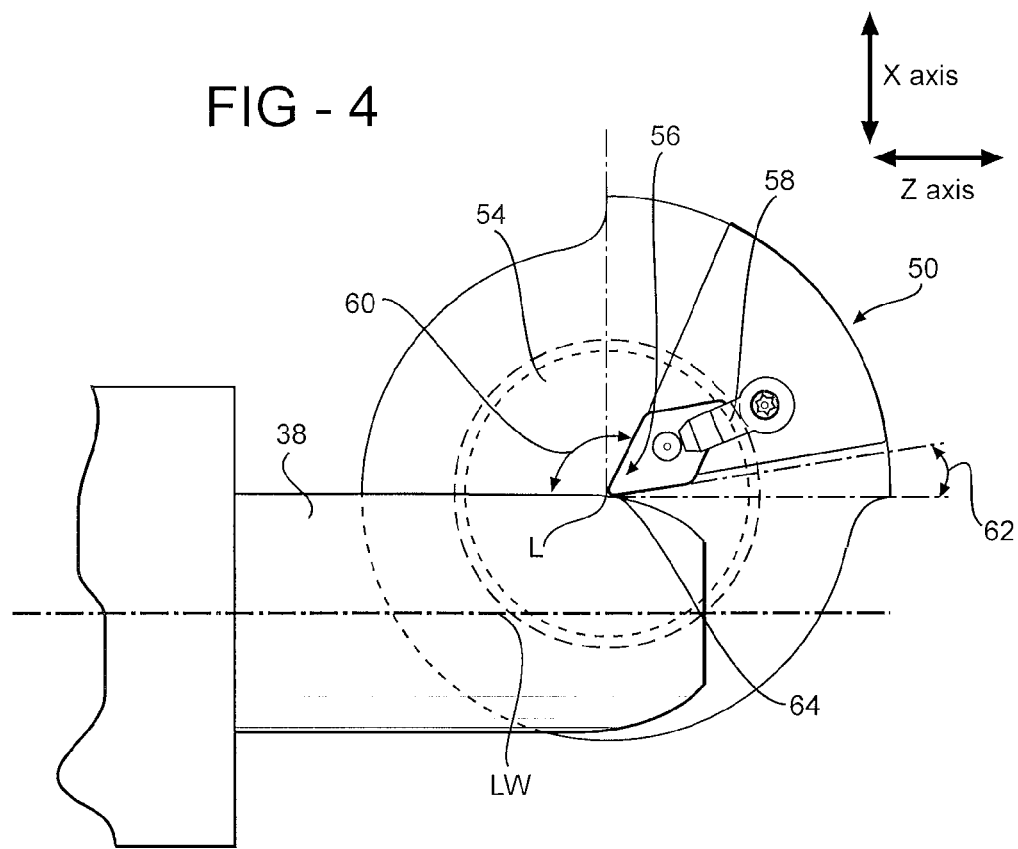
FIG. 4 shows a top view of the toolholder of FIG. 2.

Referring now to FIGS. 2-4, the toolholder 50 includes a tool shank 52 for retaining the toolholder 50 in the tool rest 42 (FIG. 1). The toolholder 50 also includes an adaptor 54 for supporting a cutting tool 56 attached to or securely fixed in a stationary position to the adaptor 54 by a means well known in the art, such as a clamp 58. As best seen in FIG. 3, a rake angle 61 is defined as the angle formed between the top of the cutting tool 56 (rake face 57) and the plane passing through the longitudinal axis, LW, or centerline of the workpiece 38. A flank clearance angle 63 is defined as the angle formed between the cutting edge of the cutting tool 56 and the workpiece 38, sometimes referred to as an end relief angle. As best seen in FIG. 4, a lead angle 60 is defined as the angle formed between the leading edge of the cutting tool 56 and the workpiece 38. In addition, a trailing angle 62 is defined as the angle formed between the trailing edge of the cutting tool 56 and the workpiece 38. Preferably, the cutting tool 56 includes a cutting tool nose radius 64 that is substantially concentric with the longitudinal axis, L, or centerline of the toolholder 50 to eliminate projection errors when re-orientating the lead angle 60 of the cutting tool 56. However, the invention can be practiced without the cutting tool nose radius 64 being substantially concentric with the longitudinal axis, L, or centerline of the toolholder 50.

An aspect of the toolholder 50 of the invention is that a critical angle, such as the lead angle 60 and/or the trailing angle 62, of the cutting tool 56 is selectively determined by the software program of the CNC for each portion of the geometry of the workpiece 38 as a vector of movement of one of the linear axes is changed. The lead angle 60 and/or the trailing angle 62 can be selectively determined by controlling the rotary axis (B-axis) and/or rotation axis, CT2, of the machine tool 10 to move to a specified position in synchronization with the movement of one of the three axes of linear motion (X-axis, Y-axis and Z-axis). In addition, the machine tool 10 can be programmed to move at a specified velocity in sequential or simultaneous synchronization with the movement of one of the three axes of linear motion (X-axis, Y-axis and Z-axis).

Specifically, the critical angle, such as the lead angle 60 and/or the trailing angle 62, can be selectively determined by controlling the rotary axis, B, and/or the rotation axis CT2 independently of the linear axis (X-axis, Y-axis and Z-axis). When the linear axes (X-axis, Y-axis and Z-axis) are programmed independently of the rotary and rotation axes (B and CT2), the velocity is typically expressed in units of inches or mm per min. However, most controls do not allow the units to be mixed, so simultaneous linear and rotary moves are frequently specified in "inverse time". In this case, the time allowed for repositioning of the various axes is specified, and the control system back calculates the velocity required for each axis to reach the destination coordinates at the specified point in time.

Specifically, the machine tool 10 can be programmed with a macro that is provided to the programmer into which the programmer specifies the geometry of the part to be machined and the geometric relationship of the cutting tool 56 to the workpiece 38. The macro calculates the required movements of the linear and rotary axis required to maintain the specified cutting tool geometry as the cutting tool 56 proceeds across the surface of the workpiece 38. Alternatively, the programmer can manually specify the velocity of traverse of the cutting tool 56 across the workpiece 38 and the macro can calculate the required velocity for each axis.

Figure 5:
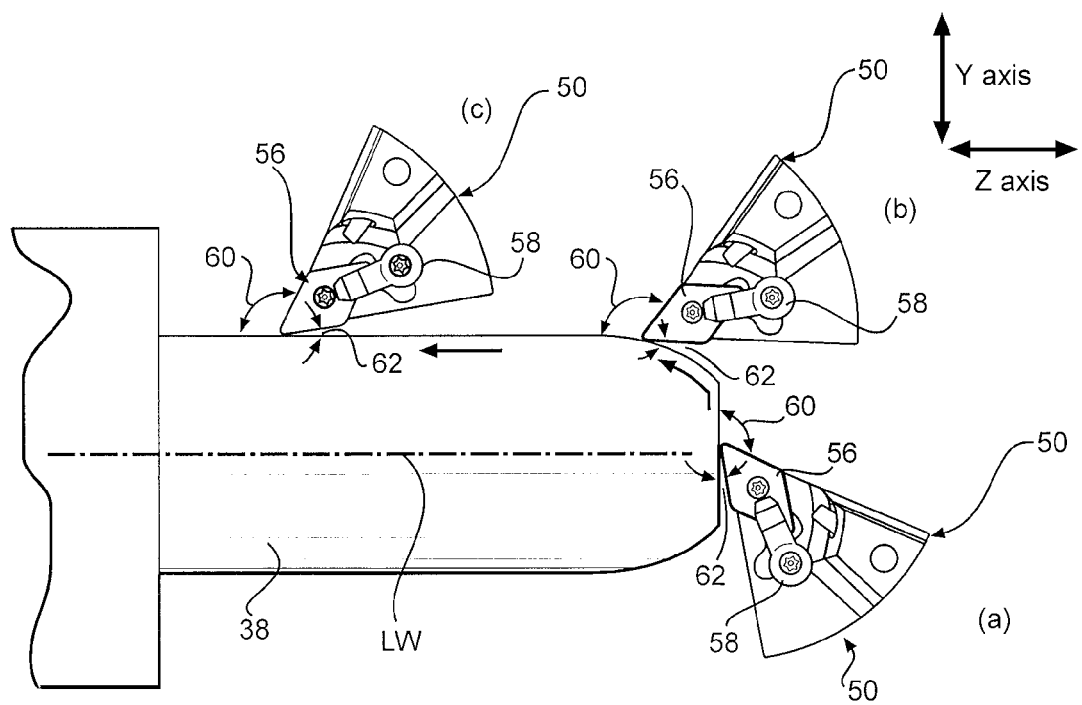
FIG. 5(*a*)-(*c*) show a top view of the toolholder engaging the workpiece with controllable lead and/or trailing angles in accordance with the invention.

Referring now to FIG. 5, a lead angle 60 is dynamically re-orientated relative to the geometry of the workpiece 38 as the cutting tool 56 moves relative to the workpiece 38, as shown in views (a), (b) and (c). Specifically, the lead angle 60 of the cutting tool 56 (as viewed in the plane of interpolation relative to a specific reference axis or initial conditions) can be specified in the program software, and the CNC can calculate and command rotation of the cutting tool 56 about the rotary axis (B-axis) and/or the rotation axis CT2 such that the lead angle 60 of the cutting tool 56 is adjusted and can be sequentially or continuously repositioned with respect to the geometry of the workpiece 38 to maintain a specified value as the vector of movement of at least one of the linear axes (X-axis, Y-axis or Z-axis) is changed.

In addition, the lead angle 60 can be used to anticipate interference between the cutting tool 56 and geometrical features of the workpiece 38. For example, the program software can react to an anticipated interference in several ways. One way is to generate an alarm to notify the operator of the anticipated interference. Another way is to automatically override the specified clearance angle 60 to prevent the anticipated interference without the need for operator intervention.

Likewise, the trailing angle 62 can be specified in the program software, and the CNC can calculate and command rotation of the cutting tool 56 about the rotary axis (B-axis) and/or the rotation axis CT2 such that the trailing angle 62 is corrected and can be sequentially or continuously repositioned with respect to the geometry of the workpiece 38 to maintain a specified value as the vector of movement of at least one of the linear axes (X-axis, Y-axis or Z-axis) is changed. By dynamically repositioning the lead angle 60 and/or the trailing angle 62 relative to the geometry of the workpiece 38, the performance of the cutting tool 56 is optimized, particularly when the cutting tool 56 comprises a wiper insert in a turning operation.

Figure 6:
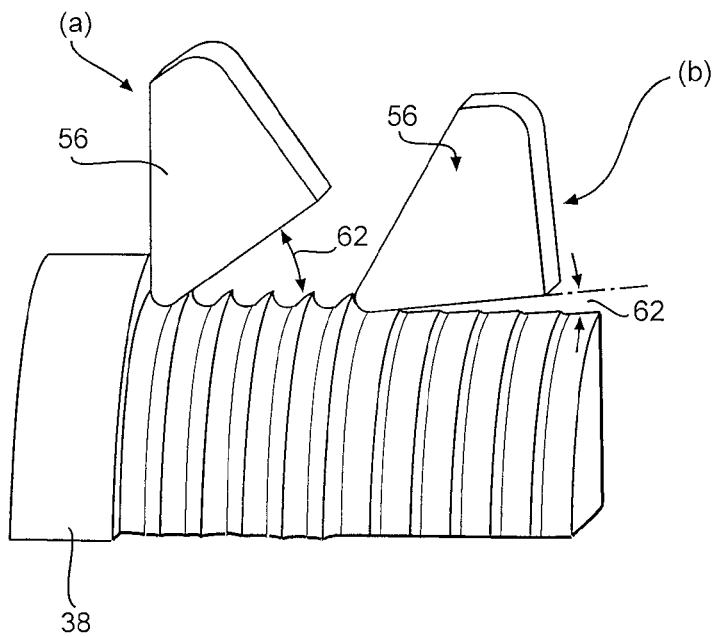
FIGS. 6(*a*) and (*b*) show a perspective view of the cutting tool, such as a wiper insert, engaging the workpiece with a relatively large trailing angle on roughing passes and a minimum trailing angle on the finishing pass, respectively.

Referring now to FIG. 6, the trailing angle 62 of the wiper cutting tool 56 can be selectively orientated with respect to the workpiece 38 such that the wiper does not contact the workpiece 38 during roughing passes, and only contacts the workpiece 38 during the finish pass, thereby extending the life of the wiper cutting tool 56, as shown in views (a) and (b). By selectively optimizing the trailing angle 62 for each portion of the geometry of the workpiece 38, a superior surface finish on the surface of the workpiece 28 having a complex geometry is achieved. In addition, the life of the cutting tool 56 can be optimized by allowing the trailing angle 62 to be reduced to an optimum value for finishing only when finishing is being performed, thereby protecting that portion of the cutting tool 56 that is used during other cutting operations. Further, by selectively controlling the trailing angle 62 to be an optimized value, a superior surface finish at high feed rates normally obtained only with wiper inserts can be achieve with conventional inserts, thereby reducing tool inventories and setup complexity. Alternatively, improved surface finishes can be obtained with conventional wiper inserts by selectively controlling the trailing angle 62 to an optimized value such that the wiper portion of the insert remains substantially tangent to the workpiece 28.

However, there are a variety of special turning operations, such as steep pitch angle turning (grooving and threading), in which tool performance is not optimized with the traditional orientation of the cutting insert with the rake face in the X-Y plane. The present invention provides a method and device to orient the cutting tool that optimizes tool performance by orienting the rake face 57 (FIG. 3) normal to the path of the cutting tool 56 as it travels around the workpiece 38.

In general, the present invention utilizes the rotary axis, B, and/or the rotation axis, CT2, so that the cutting tool 56 can be positioned normal to a pitch angle 65 of the thread to be machined. When the rotary axis, B, and/or rotation axis, CT2, is in a reference position, and if the rake angle 61 is essentially zero, then the rake face 57 is essentially in the X-Z plane and the clearance angles (on both sides of the cutting tool 56) are essentially symmetrical. Before initiation of the threading cycle, the rotary axis, B, and/or rotation axis, CT2, is rotated to bring the rake face 57 perpendicular to the pitch of the thread. Then, the threading cycle to be performed in the X- and Z-axis is initiated.

Figure 7:
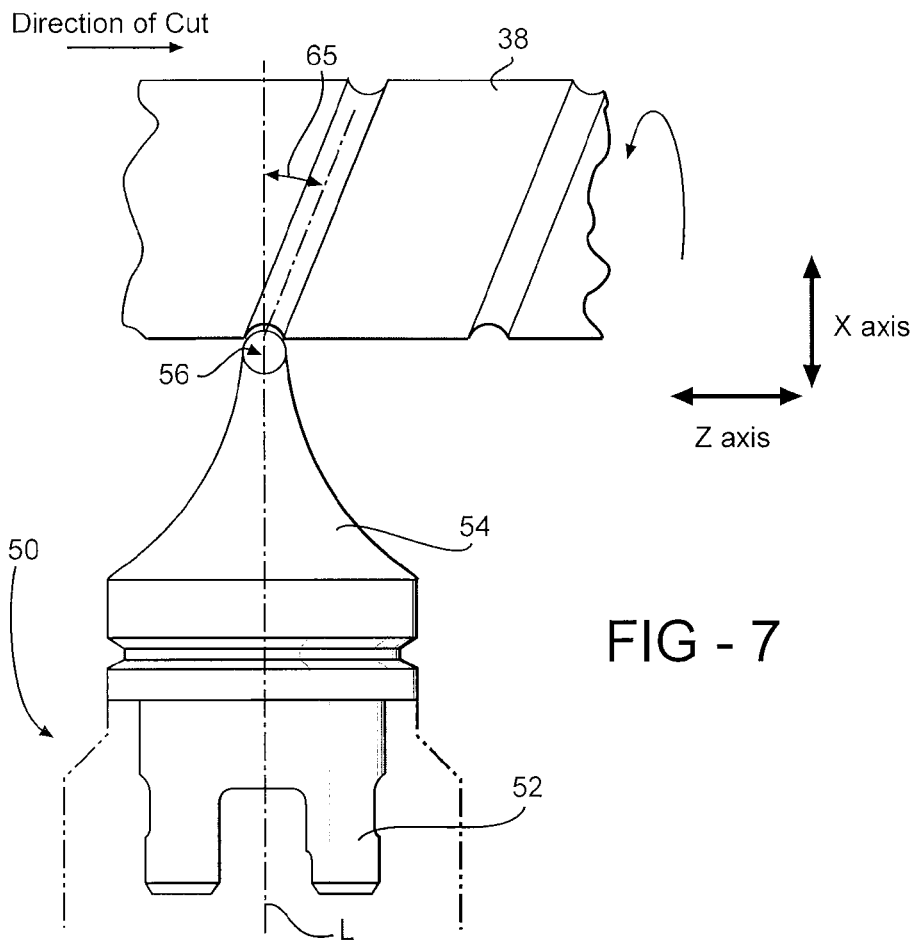
FIG. 7 shows a machine tool with a toolholder for optimizing the rake angle of the cutting tool as the cutting tool travels around the workpiece.

One technique for optimizing the orientation of the rake angle 61 as the cutting tool 56 travels around the workpiece 38 is shown in FIG. 7. The first technique positions the rake face 57 of the cutting tool 56 normal or perpendicular to a pitch angle 65 as the cutting tool 56 travels along the Z-axis to form the thread in the workpiece 38. This is accomplished by rotating the rotation axis, CT2, of the machine tool 10 to be substantially equal to the pitch angle 65 so as to position the rake face 57 of the cutting tool 56 normal to the pitch angle 65. In this technique, the depth of cut is determined by the tool holder 50 as it travels along the X-axis. Thus, this technique uses a tool machine configuration in which the workpiece 38 is rotated (as indicated by the arrow), two axes of linear motion (X- and Z-axis) for positioning of the cutting tool 56, and the rotation axis, CT2, for positioning of the cutting tool 56, where the rotation axis, CT2, has a centerline in the X-Z plane and parallel to the X-axis. It will be appreciated that the pitch angle 65 can be selected as a function of the geometry of the workpiece 38 and the cutting tool 56 to obtain a desired clearance angle defined as the angle between the flank face of the cutting tool 56 and the workpiece 38.

Figure 8:
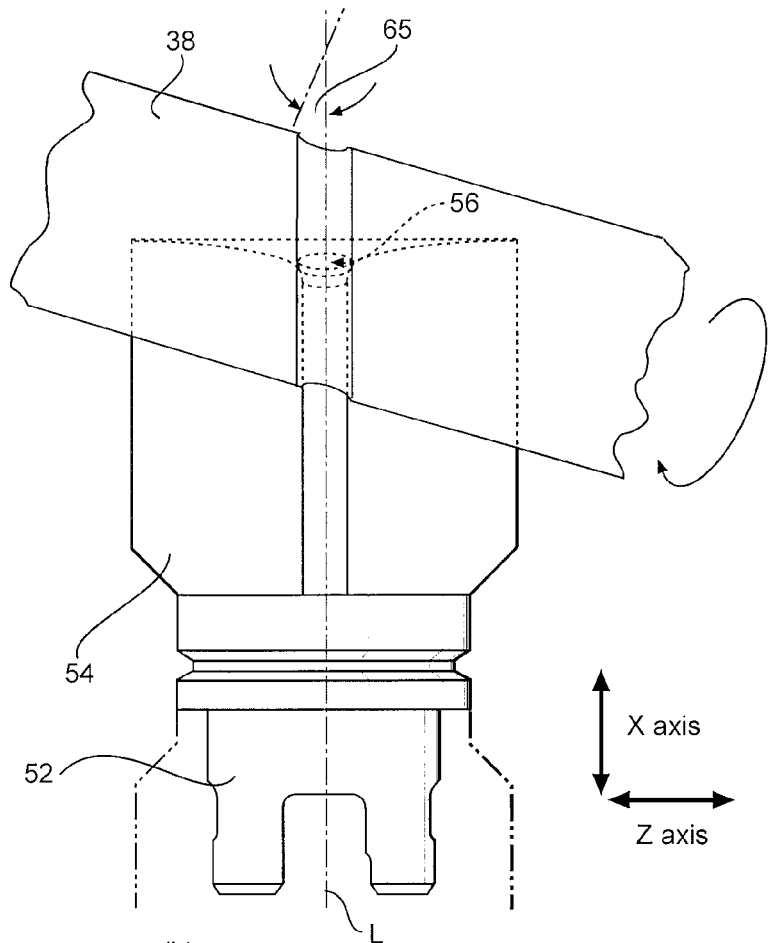
FIG. 8 shows another embodiment of a machine tool with a toolholder for optimizing the rake angle of the cutting tool as the cutting tool travels around the workpiece.

Another technique for optimizing the orientation of the rake angle 61 is shown in FIG. 8. This technique also positions the rake face 57 of the cutting tool 56 normal or perpendicular to the pitch angle 65 as the toolholder 50 travels along the Z-axis to form the thread in the workpiece 38. This is accomplished by rotating the rotary axis, B, of the machine tool 10 to be substantially equal to the pitch angle 65 so as to position the rake face 57 of the cutting tool 56 normal to the pitch angle 65. In this technique, the depth of cut is determined by the toolholder 50 as it travels along the Y-axis (into the page).

Figure 9:
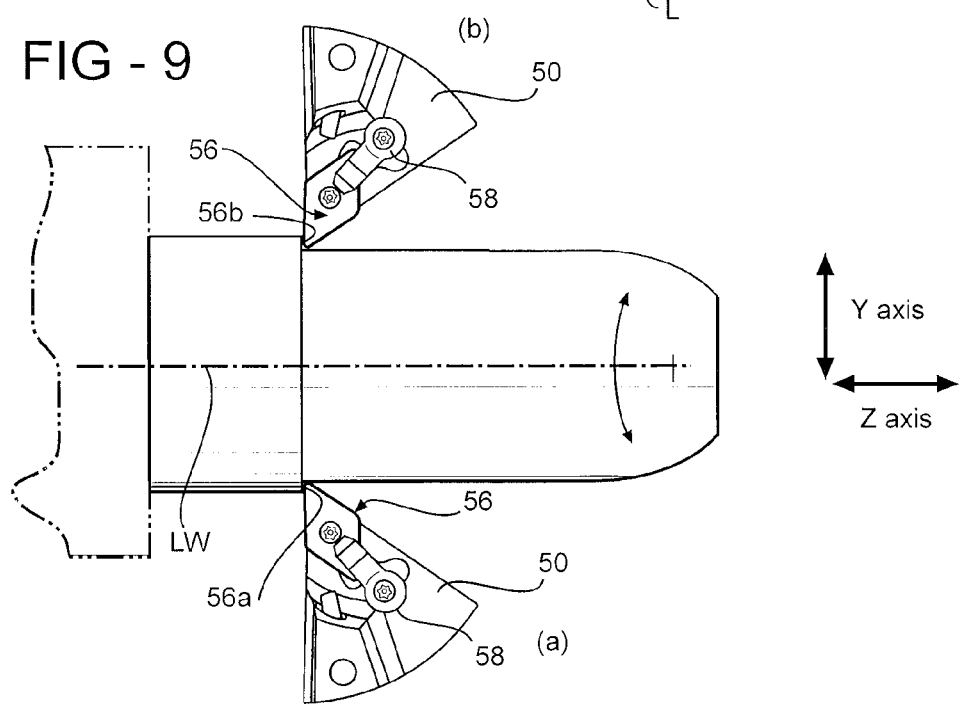
FIGS. 9(a) and (b) shows one aspect of the invention in which the machine tool and toolholder can be moved along the Y-axis and positioned on either side of the longitudinal axis of the workpiece.

Another aspect of the invention is that the cutting tool 56 can be positioned on either side of the longitudinal axis, LW, or centerline of the workpiece 38, as shown in FIG. 9. In FIG. 9(*a*), the cutting tool 56 is positioned on one side (below) the centerline LW of the workpiece 38. In this position, a flank 56*a* of the cutting tool 56 is being utilized to perform the machine operation as the workpiece 38 rotates in a first direction. By utilizing the Y-axis on each side of the longitudinal axis, LW, or centerline of the workpiece 38, as shown in FIG. 9(*b*), a flank 56*b* of the cutting tool 56 is being utilized to perform the machine operation while the workpiece 38 rotates in a second, opposite direction. By reversing a direction of rotation of a workpiece, and positioning the cutting tool on opposite side of a centerline of rotation of the workpiece, the number of flank faces applied to the machining process is doubled, effectively doubling tool life. Using this aspect of the invention is highly desirable when the mode of ultimate tool failure is at DOC (depth of cut), particularly when machining stainless and high-temperature alloys in which the most severe tool wear is at the point on the flanks 56*a*, 56*b* of the cutting tool 56.

Figure 10:
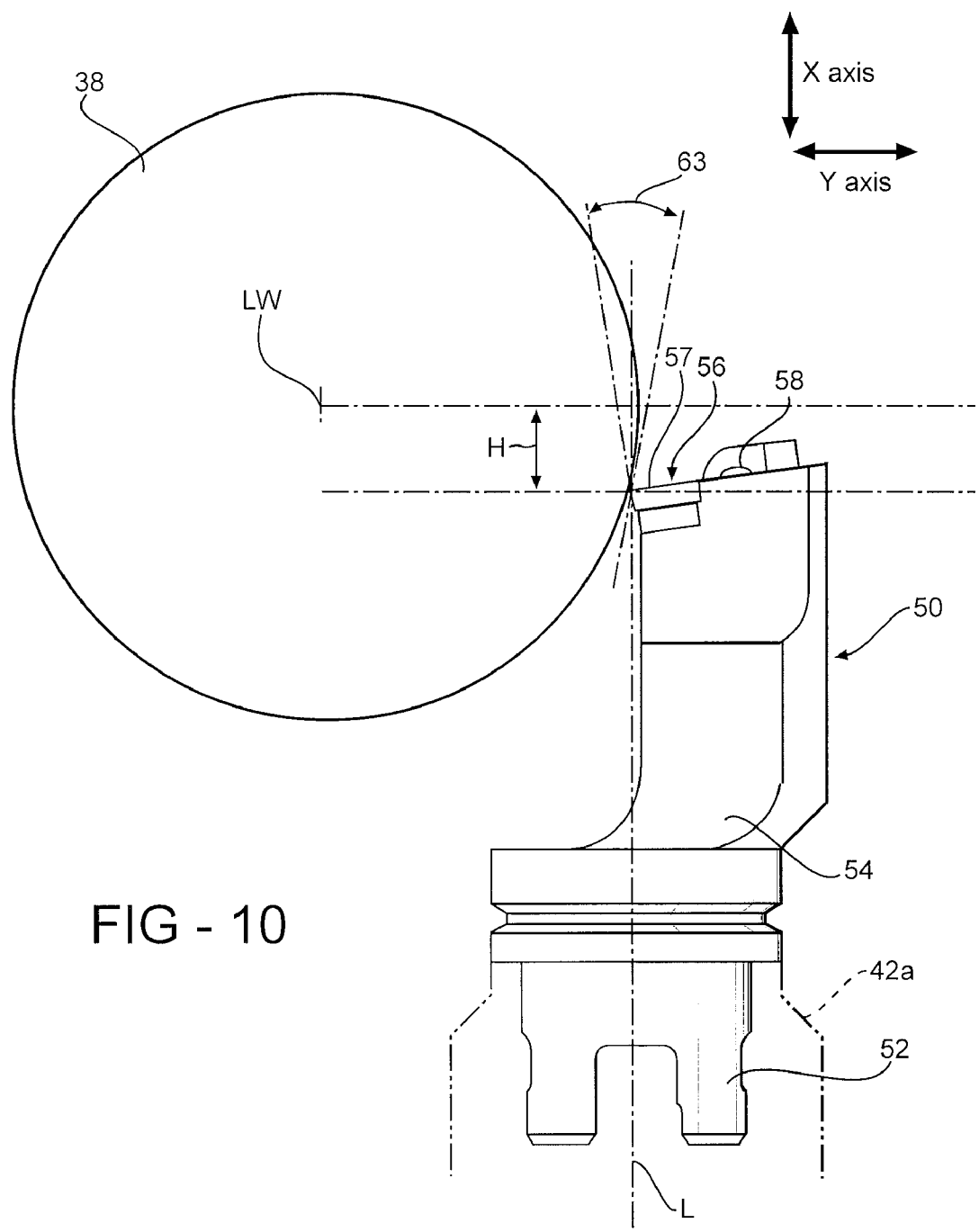
FIG. 10 shows a side view of the toolholder of FIG. 2 with an offset between the centerline of the workpiece and the toolholder rake face.

Yet another aspect of the invention is that the rake face 57 of the cutting tool 56 can be positioned on either side of the longitudinal axis, LX, of the workpiece 38 by a distance, H, as shown in FIG. 10. It is noted that the longitudinal axis, LX, is substantially perpendicular to the Y-axis and substantially parallel to the X-axis. Noting that the distance, H, is directly proportional to the diameter of the workpiece 38, the cutting tool 50 can be programmed to vary the distance, H, as the cutting tool 50 removes material and moves towards the center of the workpiece 38. Thus, the clearance angle 63 can be programmed to remain constant as the cutting tool 50 moves towards the center of the workpiece 38. It will be appreciated that the distance, H, can be varied along the Y-axis, as well as the X-axis, depending on the orientation of the rake face 57 of the cutting tool 56.

As described above, the present invention provides a controllable toolholder for a machine tool having movement along at least one linear axis, and having at least one rotary and/or rotation axis. It should be appreciated that the embodiments described above are representative of only a few of the possible machine tool configurations in which the principles of the invention can be applied, and that the principles of the invention can be applied to any machine tool configuration with the appropriate range of movements.

The documents, patents and patent applications referred to herein are hereby incorporated by reference.

While the invention has been specifically described in connection with various embodiments thereof, it is to be understood that this is by way of illustration and not of limitation, and the scope of the appended claims should be construed as broadly as the prior art will permit.

What is claimed is:

1. A machine tool, comprising:
a toolholder mounted to a tool rest, the toolholder including a cutting tool defining a lead angle between a leading edge of the cutting tool and a workpiece and a trailing angle between a trailing edge of the cutting tool and the workpiece, the toolholder having a rotary axis and a rotation axis that is programmable to move to a specific position in sequential or simultaneous synchronization with a movement about the workpiece with respect to at least one linear axis,
wherein one of the lead angle and the trailing angle remains constant by controlling the movement of one of the rotary axis and the rotation axis with respect to the workpiece independently of the movement with respect to the at least one linear axis while at least one movement vector of the at least one linear axis is changed, and
wherein the lead angle of the cutting tool is used to anticipate interference between the cutting tool and the workpiece.

2. The machine tool according to claim 1, wherein the cutting tool defines a first trailing angle during a roughing pass and a second trailing angle during a finishing pass, the second trailing angle being different than the first trailing angle.

3. The machine tool according to claim 1, wherein the cutting tool includes a cutting tool nose radius that is substantially concentric with one of the rotary axis and the rotation axis of the toolholder.

4. The machine tool according to claim 1, wherein the cutting tool is positioned on one side of a centerline of the workpiece when the workpiece rotates in a first direction, and wherein the cutting tool is positioned on an opposite side of the centerline of the workpiece when the workpiece rotates in a second, opposite direction.

5. A programmable toolholder, the toolholder being mounted in a tool rest of a machine tool, the toolholder having a rotary axis and a rotation axis being programmable to move to a specified position in synchronization with a movement of one of at least three mutually perpendicular linear axes, the toolholder comprising:
a tool spindle for retaining the toolholder in the tool rest;
an adaptor for supporting a cutting tool retained in the adaptor by a clamp, the cutting tool defining a lead angle between a leading edge of the cutting tool and a workpiece and a trailing angle between a trailing edge of the cutting tool and the workpiece,
wherein one of the lead angle and the trailing angle remains constant by controlling the movement of one of the rotary axis and the rotation axis with respect to the workpiece independently of the movement with respect to the at least three mutually perpendicular linear axes, while at least one movement vector of the at least three mutually perpendicular linear axes is changed, and
wherein the lead angle of the cutting tool is used to anticipate interference between the cutting tool and the workpiece.

6. The toolholder according to claim 5, wherein the cutting tool defines a first trailing angle during a roughing pass and a second trailing angle during a finishing pass, the second trailing angle being different than the first trailing angle.

7. The toolholder according to claim 5, wherein the cutting tool includes a cutting tool nose radius that is substantially concentric with a longitudinal axis of the toolholder.

8. The toolholder according to claim 5, wherein the cutting tool is positioned on one side of a centerline of the workpiece when the workpiece rotates in a first direction, and wherein the cutting tool is positioned on an opposite side of the centerline of the workpiece when the workpiece rotates in a second, opposite direction.

9. The toolholder according to claim 1, wherein the cutting tool includes a cutting tool nose radius that is substantially concentric with a longitudinal axis of the toolholder.

10. The toolholder according to claim 5, wherein the cutting tool includes a cutting tool nose radius that is substantially concentric with a longitudinal axis of the toolholder.

11. The machine tool according to claim 1, wherein a clearance angle of the cutting tool is adjusted with respect to a geometry of the workpiece.

12. The machine tool according to claim 1, wherein the lead angle of the cutting tool is adjusted with respect to a geometry of the workpiece.

13. The machine tool according to claim 1, wherein a rake face of the cutting tool is substantially perpendicular to one of the rotary axis and the rotation axis of the toolholder.

* * * * *

UNITED STATES PATENT AND TRADEMARK OFFICE
CERTIFICATE OF CORRECTION

PATENT NO. : 8,234,958 B2
APPLICATION NO. : 12/169368
DATED : August 7, 2012
INVENTOR(S) : Hyatt et al.

It is certified that error appears in the above-identified patent and that said Letters Patent is hereby corrected as shown below:

ON THE TITLE PAGE

Title Page 2, in Field (56), under "U.S. PATENT DOCUMENTS", in Column 1, Line 4, delete "Ishii" and insert -- Ishili --, therefor.

IN THE SPECIFICATION

In Column 2, Line 67, delete "respectively." and insert -- respectively; --, therefor.

IN THE CLAIMS

In Column 8, Line 38, in Claim 9, delete "toolholder" and insert -- machine tool --, therefor.

Signed and Sealed this
Ninth Day of April, 2013

Teresa Stanek Rea
*Acting Director of the United States Patent and Trademark Office*